United States Patent [19]
Chuang

[11] Patent Number: 4,836,247
[45] Date of Patent: * Jun. 6, 1989

[54] REGULATOR MEANS FOR AUTOMATICALLY SHUTTING THE GAS PIPELINE PASSAGE OFF DURING PRESSURE REDUCING FAILURE

[76] Inventor: Rong-Chao Chuang, 113 Nan-Yang Rd., Nan-Tsu, Kaohsiung, Taiwan

[*] Notice: The portion of the term of this patent subsequent to Nov. 29, 2005 has been disclaimed.

[21] Appl. No.: 172,376

[22] Filed: Mar. 24, 1988

Related U.S. Application Data

[63] Continuation of Ser. No. 8,764, Jan. 30, 1987, abandoned.

[51] Int. Cl.$^4$ .............................................. F16K 31/48
[52] U.S. Cl. ........................... 137/624.12; 137/505.47; 137/495; 137/460; 137/613
[58] Field of Search ...................... 137/624.11, 624.12, 137/505.47, 460, 461, 495

[56] References Cited

U.S. PATENT DOCUMENTS

| | | | |
|---|---|---|---|
| 3,180,356 | 4/1965 | Galley | 137/495 |
| 3,228,417 | 1/1966 | Schwerter | 137/461 |
| 3,424,194 | 1/1909 | Krugan | 137/505.47 X |
| 3,542,052 | 11/1970 | Irwin | 137/505.11 X |
| 3,623,506 | 11/1971 | Bonner | 137/613 |
| 4,223,692 | 9/1980 | Perry | 137/460 X |
| 4,265,270 | 5/1981 | Satoh | 137/495 X |

Primary Examiner—Alan Cohan
Attorney, Agent, or Firm—Leonard Bloom

[57] ABSTRACT

This invention relates to a regulator means for automatically shutting off gas flow in a pipeline during the occurrence of a pressure reducing failure. The regulator means of the invention comprises a body member, a pressure reducing valve device, a piston valve assembly, a timing device, a transmission device, and an overflow control device. The body member is provided with a pressure reducing valve chamber separated by a thin wall from a timing device chamber. The timing device chamber receives the timing device and the transmission device. The transmission device includes a transmission plate and a transmission plate base. A through hole in the body member passes through the thin wall to communicate with a piston valve assembly. The piston valve assembly is mounted in the through hole under the lower side of a pressure reducing valve chamber. A leak-proof diaphragm separates the timing device and transmission device from the piston valve assembly. The transmission device opens the piston valve assembly to permit gas of reduced pressure to flow to the outlet port. The piston valve assembly closes when a pressure reducing failure occurs. An automatic overflow control device is provided at the gas inlet port in the body member. The overflow control device includes an automatic shut-off pipeline passage assembly and a release button. When high pressure gas overflows, the automatic shut-off pipeline passage assembly immediately shuts off the pipeline passage, so that the gas will no longer flow.

14 Claims, 5 Drawing Sheets

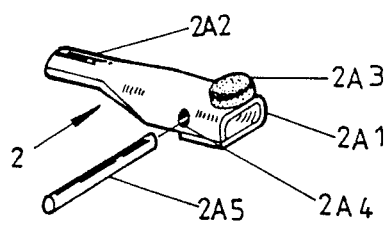
FIG-2
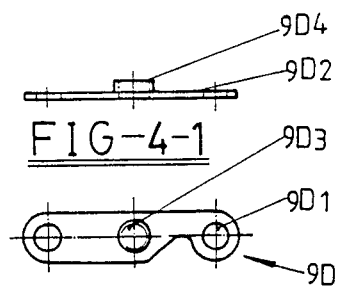
FIG-4-1
FIG-4-2
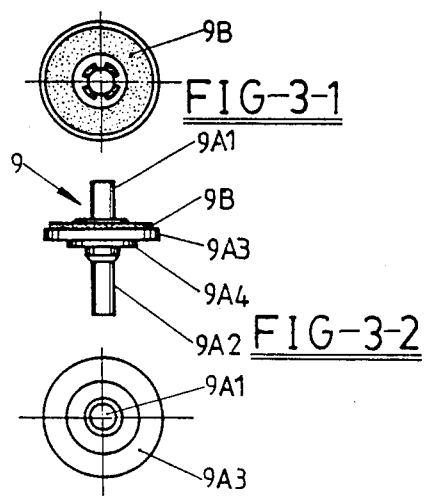
FIG-3-1
FIG-3-2
FIG-3-3
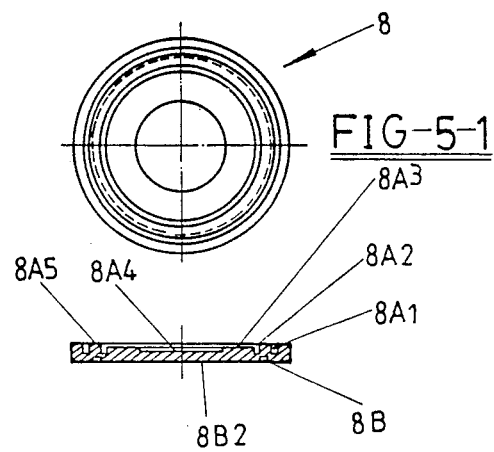
FIG-5-1
FIG-5-2

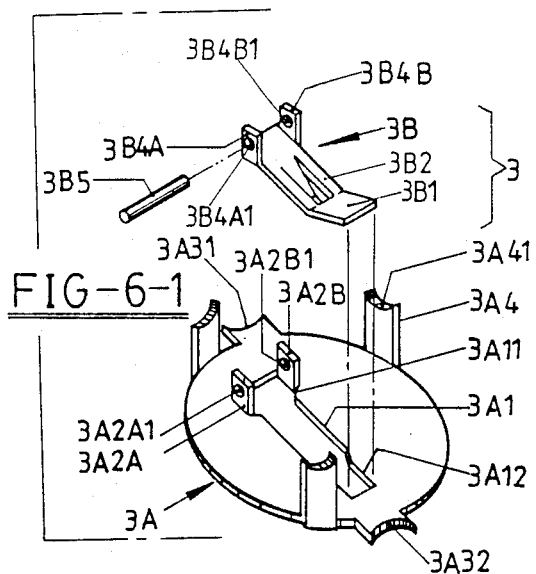
FIG-6-1
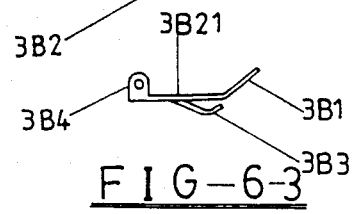
FIG-6-2
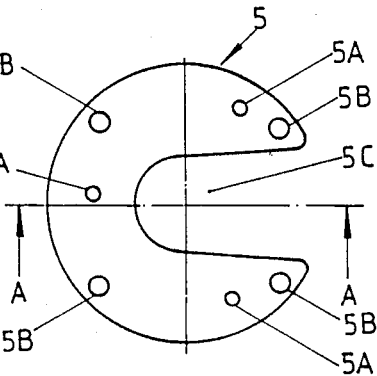
FIG-6-3
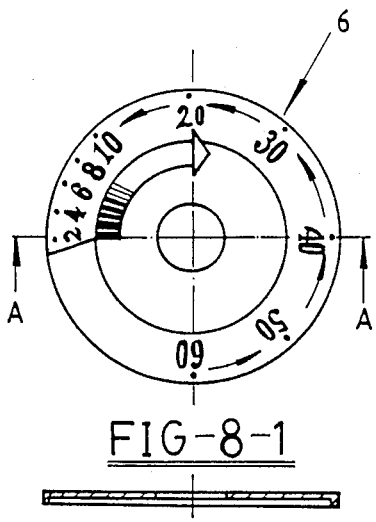
FIG-8-1
FIG-8-2
FIG-7-1
FIG-7-2
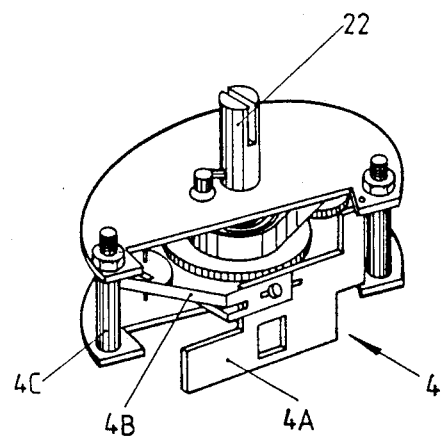
FIG-9

REGULATOR MEANS FOR AUTOMATICALLY SHUTTING THE GAS PIPELINE PASSAGE OFF DURING PRESSURE REDUCING FAILURE

This is a continuation of application Ser. No. 008,764, filed 1-30-87, and now abandoned.

BACKGROUND OF THE INVENTION

Currently, liquified propane gas fuel is widely utilized in ordinary households. The apparatus using liquefied propane gas includes a high pressure reducing regulator, and a low pressure pipeline connected with, for example, a gas oven, in which, the pressure reducing regulator has two functions: to transform the approximately 6 kg/cm$^2$ (60000 mmHg) high pressure gas in the steel cylinder to approximately 400 mmHg. low pressure gas and to release the high pressure gas if the pressure reduction function fails. A cause of pressure reducing failure is often simply because a user forgets to shut off the main supply valve or because foreign matter is deposited at a contact place between the outer end of a gas inlet port in the pressure reducing regulator means and a rubber pad attached to the head of a lever type boltshaft for reducing pressure. Such foreign matter prevents the rubber pad from normally adjusting the gas flow rate out of the gas inlet resulting that the pressure of the high pressure gas cannot be reduced to a predetermined level but results in a gradual pressure increase in the pressure reducing chamber. If no proper measure is taken to remove the defect, and the gas supply is still on, the low pressure pipeline will be damaged and may cause a disaster from leaking gas. To avoid such a danger, a conventional pressure reducing regulator is provided with an automatic pressure relief design to respond to a pressure reducing failure to automatically and immediately discharge the high pressure gas through a relief valve, whenever the pressure reduction fails and the pressure in the pressure reducing chamber is higher than the preset pressure. Although such a conventional design can prevent the high pressure gas from damaging the low pressure pipeline, it still has the following disadvantages. It is impossible to sense the pressure reducing failure and it is easy for disasters to occur, if and when the gas supply continuously flows without any warning. Although a relief valve is attached to a conventional pressure reducing regulator to discharge the high pressure gas from within, the discharged gas would fill up the space in the house, since for convenience the user often stores the gas steel cylinder in the house. This conventional method is still highly risky and poses a threat to harm the humans as well as damaging property. When the pressure reducing failure takes place during use, the high pressure gas may damage the low pressure pipeline and then leak gas in a large amount to cause a grave disaster.

Other conventional devices provide that a gas regulator means and an automatic flow shut-off device are used together to achieve the object of safety. For instance, the following U.S. Pat. Nos. are known: Satch 4,265,270; Joseph at al., 3,623,506; Kruzan et al., 3,228,417; Irwzn et al. 3,542,052; Galley et al., 3,180,356; Perry, 4,223,692; and Belese, 1,339,383. However, up to the present, the conventional devices have their own defects in that their structures are so complicated that a DC motor sensor or detector, or electromagnetic valve are used for control which often increases cost and also increases the damage rate of the whole assembly as shown, for instance in the U.S. Pat. Nos: 4,265,270, 3,180,350 and 4,233,692. Also in the prior art, a tool may be used for resetting the regulator, and this is comparatively more inconvenient, as disclosed for example in the U.S. pat. Nos. 3,623,506; 3,424,194, and 3,228,417. In the prior art, when abnormal overpressure conditions take place, the gas is discharged into the atmosphere. However, this discharge poses dangers of explosion, as for instance with the device disclosed in U.S. Pat. No. 3,542,052. Furthermore, none of the devices mentioned above are applied to situations where timers must be used to avoid fires due to a user's carelessness to shuff off the gas valve.

In order to overcome the defects of conventional regulator means, the applicant has thoroughly studied them and finally created this invention, a regulator means for automatically shutting off gas pipeline passage during a pressure reducing failure. The invention has three functions: to automatically shut off the flow of gas in the pipeline during gas overflow; to automatically shut off the flow of gas in the pipeline at a preset time; and to automatically signal the occurrence of a pressure reducing failure.

SUMMARY OF THE INVENTION

Accordingly, an object of this invention is to provide a regulator means for automatically shutting off the flow of gas in a pipeline during pressure reducing failure.

Another object of the invention is to rapidly sense pressure reducing failure when an automatically timed shut-off device is operated.

Another object of the invention is to provide a regulator means for automatically shutting off gas flow in a pipeline during pressure reducing failure where a piston valve is used to cut off the gas passage in the flow direction.

A further object of the invention is to provide a regulator means for automatically shutting gas pipeline passage off during pressure reducing failure which can automatically shut off the gas flow passage, in response to a gas overflow.

The regulator means of the invention for automatically shutting the flow of gas in a pipeline during pressure reducing failure includes: body member; a timing device; pressure reducing valve assembly; piston valve assembly; a transmission device assembly; and an automatic overflow control device. The body member basically includes a timing device chamber, a pressure reducing valve chamber, and a thin wall between said timing device chamber and said reducing valve chamber. The automatic overflow control device is positioned at the gas inlet pipeline. The timing device is received within the timing device chamber and, the pressing plate in the timing device actuates the piston valve installed in the reducing valve chamber via the transmission plate. When the regulator means is activated, after the gas pressure is reduced by the pressure reducing valve, then the pressure-reduced gas flows to the gas outlet pipeline through the piston valve.

The present invention will be best understood when the description of the preferred embodiments is read in connection with the accompanying drawings.

DESCRIPTION OF THE DRAWINGS

In the drawings:

FIG. 1-1 is a top view of the body member. FIG. 1-2 is a sectional view along the central line of FIG. 1-1 and the enclosed area N in the FIG. 1-2 is a sectional view of an automatic overflow control device. FIG. 1-1 is a bottom view of the body member.

FIG. 2 is a perspective view of the lever type bolt shaft in the pressure reducing valve of the regulator means of the invention.

FIGS. 3-1, 3-2, and 3-3 are respectively top, side, and bottom views of the piston valve in regulator means of the invention.

FIGS. 4-1 and 4-2 are respectively side and top views of the centering guide plate for the piston valve of regulator means of the invention.

FIGS. 5-1 and 5-2 are respectively top and side views of the leakage-proof diaphragm between the piston valve and the transmission assembly in the regulator means of the invention.

FIG. 6-1 is a partially exploded perspective view of the transmission assembly in the regulator means of the invention.

FIGS. 6-2 and 6-3 respectively are top and side views of the transmission plate of the transmission assembly shown in FIG. 6-1.

FIGS. 7-1 and 7-2 respectively are top and side views of a cover plate for the timing device in the regulator means of the invention.

FIGS. 8-1 and 8-2 are respectively a top and side view of a timer adjustment plate for the regulator means of the invention.

FIG. 9 is a perspective view of the timing device, with its pressing plate and its leaf spring.

DETAILED DESCRIPTION OF THE INVENTION

Figure 1:
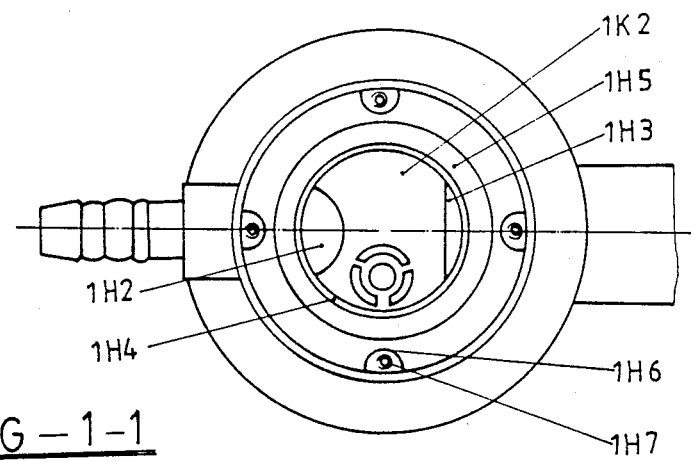
FIGS. 1-1, 1-2, and 1-3 together are views of the body member of the regulator means of the invention. More specifically.

Referring to FIGS. 1-1, 1-2, 1-3 and 11, the body member 1 is of cylindrical shape. The outer ends of its two sides are gas inlet port 1A and outlet port 1B respectively. An inlet nozzle $1A_1$ is provided close to the inner end of said inlet port 1A in said body member. A thin wall 1K is formed integrally with said body member 1 and transversely located in said body member and divides the hollow space in said body member into a pressure reducing valve chamber 1E and a timing device chamber 1H. A telescopic through hold $1E_1$ is biased off the center of said thin wall surface and passes through said thin wall 1K. Three gas outlet ports $1E_2$ are provided around the outer periphery of said telescopic through hole $1E_1$ and also passing through said thin wall. Three fine partition bars $1E_3$ are provided to separate each of said three gas outlet ports $1E_2$ respectively. An annular flange $1E_6$ which is a little higher than the wall surface $1K_1$ is provided at the outer periphery of said gas outlet ports $1E_2$ in the wall surface $1K_1$ of said thin wall 1K facing said pressure reducing valve chamber 1E. The flange $1E_6$ close to the outer periphery of said gas ports $1E_2$ is provided with two opposite thin arcuate plates $1E_4$. Said two opposite thin arcuate plates $1E_4$ are integrally formed with said wall surface $1K_1$ and are used to confine and set a space for piston valve 9. See FIG. 11.

Two opposite round support posts $1E_5$ with a suitable height are arranged at the place immediately adjacent to the outer sides of said two opposite thin arcuate plates $1E_4$. The end faces of said two opposite support round posts $1E_5$ are provided with threaded hole $1E_{51}$ for mating and securing the centering guide plate 9D (see FIGS. 4 and 11) of piston valve assembly by screws The opposite protruding posts 1D are installed symmetrically on the two front sides of inlet nozzle $1A_1$ and are higher than the inlet nozzle $1A_1$ and also have an elongated recess $1D_1$ and a threaded hole $1D_2$ respectively to secure the pressure reducing component 2 described below.

On the wall surface $1K_2$ of said thin wall 1K that faces the timing device chamber 1H and close to said gas ports, an upright annular flange $1H_4$, which is slightly higher than said wall surface $1K_2$, is provided. A semicircular groove $1H_2$ is in said wall surface $1K_2$ that is opposite to a semi-circular convex surface $1E_7$. A gas outlet port 1F is located at the semi-circular groove $1H_2$ and also on the groove surface near the gas outlet 1B. $H_2$ communicates with the outlet 1F, and also communicates with the pressure reducing valve chamber 1E when the piston valve 9 is open, thereby permitting the gas flow to the outlet 1B from the inlet 1A.

A fine elongated moon-shaped small groove $1H_3$ is provided at the corresponding place on the opposite side of the body member relative to said semi-circular groove $1H_2$ and provides the gas inlet nozzle $1A_1$ to serve as a gas inlet channel.

On the outer periphery of said upright annular flange $1H_4$, there is also an annular groove $1H_5$ to mesh with leakage-proof diaphragm 8 (see FIG. 5). A semi-circular support rack $1H_6$ is provided in said timing device chamber 1H and is also integrally formed with said body member 1, and the height of said rack $1H_6$ is a little shorter than that of the top plane of said timing device chamber 1H. The top end face of said rack $1H_6$ is provided with threaded holes to match the opposite round holes in a timing device cover plate (see FIG. 7), respectively, for fastening the timing device with screws.

Figures 1, 2:
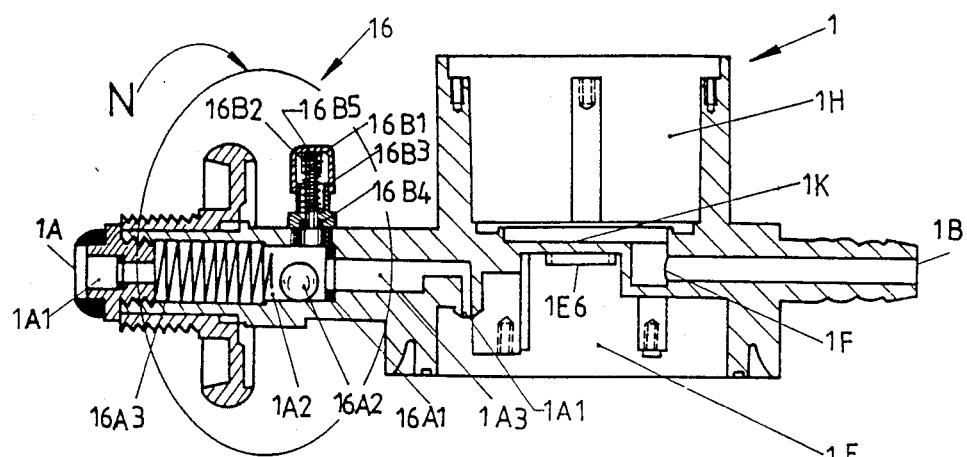
Figure 10:
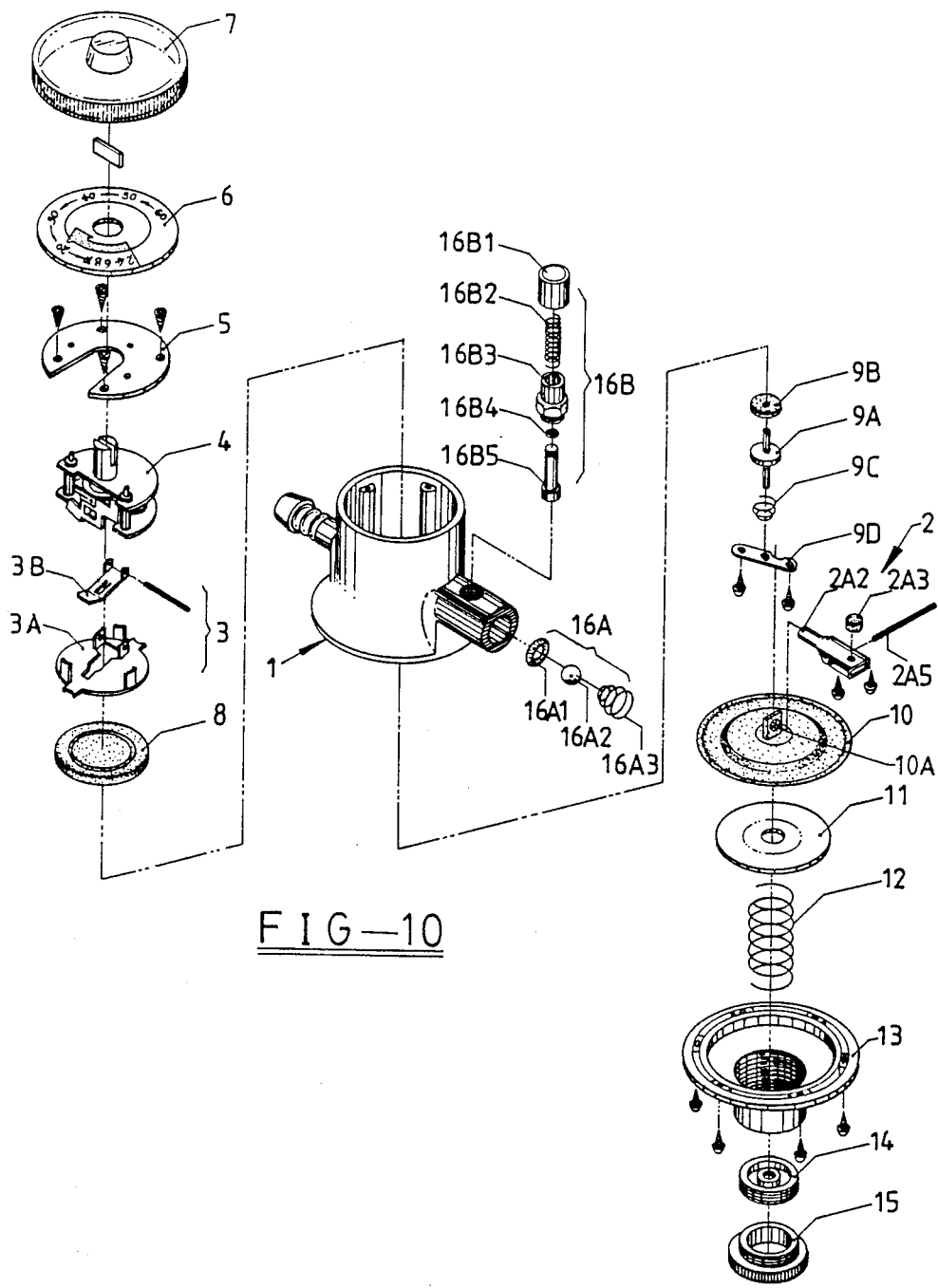
FIG. 10 is an exploded view of the regulator means of the invention for automatically shutting off the flow of gas in a pipeline during pressure reducing failure.
Figure 11:
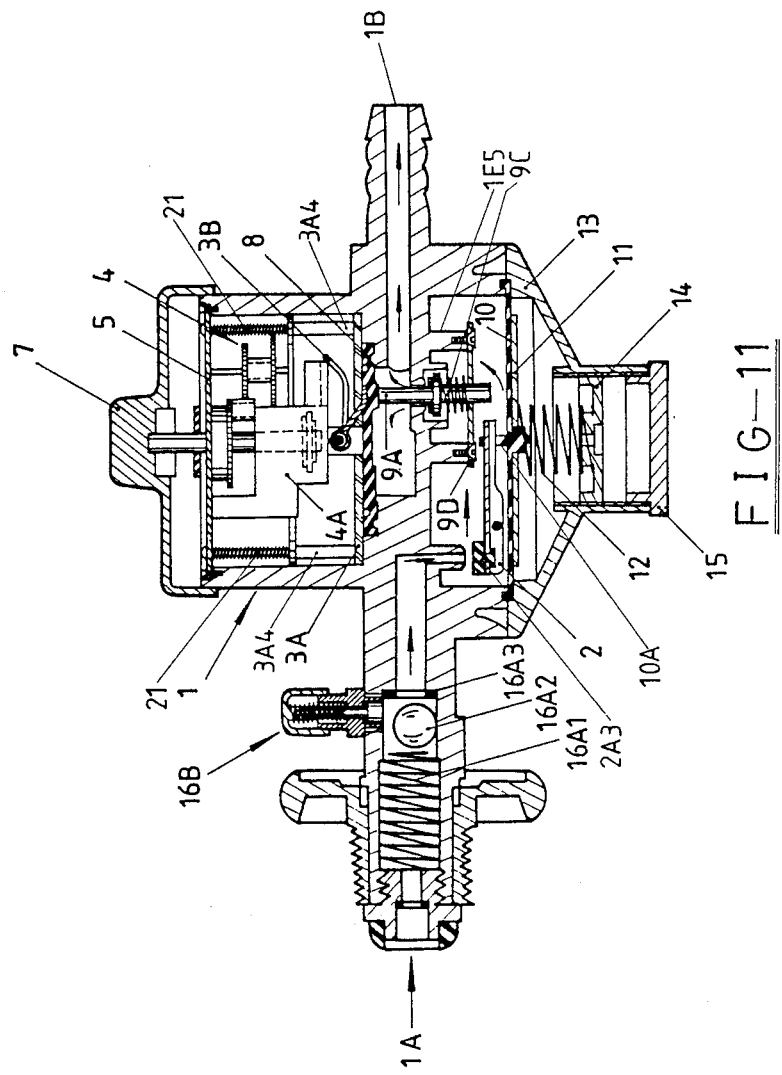
FIG. 11 is a cross-sectional view of a complete embodiment of a regulator means of the invention.

Referring to FIGS. 2, 10 and 11, the pressure reducing valve assembly is composed of a pressure reducing assembly 2, a leakage-proof diaphragm 10, a round metal plate 11, a spring 12, a cover 13, an adjustment ring 14 and a bottom cover 15. The lever-type bolt 2 in the pressure reducing assembly shown in FIG. 2 is made of bended light metal with a square hollow head $2A_1$. A round thin pad $2A_3$ made of rubber contacts the gas inlet nozzle $1A_1$. Rear end $2A_2$ is formed in a small arc cross section to secure the leakage-proof diaphragm 10 by passing through slot 10A in diaphragm 10. On each of the two sides said square hollow head $2A_1$ is oppositely provided a through hole $2A_4$ respectively, to receive a pivot shaft $2A_5$ therein. The head of the screw mating the hole $1D_2$ (see FIG. 1-3) is fixed and installed in the elongated recess $1D_1$ to secure the pressure reducing assembly by the pivot shaft 2A. The distance from the pivot shaft $2A_5$ to the tail end $2A_2$ is longer than that from the pivot shaft $2A_5$ to the head $2A_1$.

Figures 1, 2, 3:
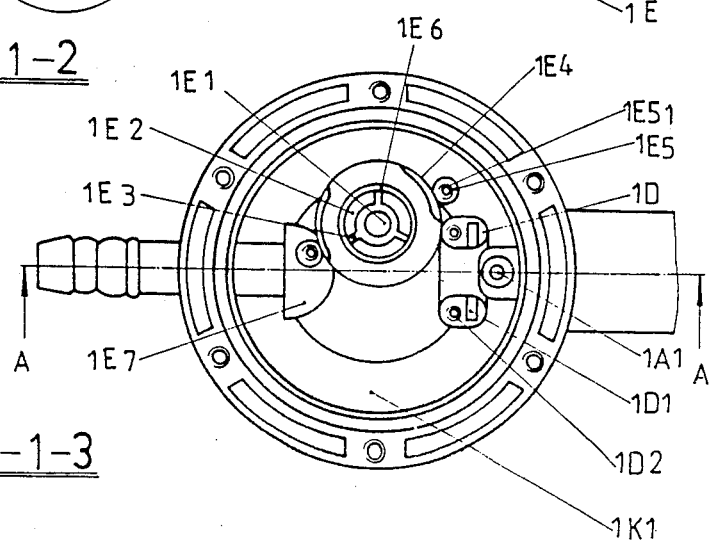

Referring to FIGS. 3-1, 3-2, and 3-3, a piston $9A_1$ of piston valve assembly 9 is illustrated. Said piston valve assembly consists of a piston $9A_1$, a leakage-proof rubber pad 9B, a spiral spring 9C (see FIGS. 10 and 11) and a centering guide plate 9D (see FIGS. 4 and 11), in which said piston $9A_1$ is provided with an upper round protruding post $9A_2$, a round plate $9A_3$ and an annular projection $9A_4$ formed below said round plate $9A_3$. Said leakage-proof rubber pad 9B is bonded on the top plane of the round plate $9A_3$. The upper round protruding post $9A_1$ above said piston 9A is inserted into the hole $1E_1$ from the pressure reducing valve chamber 1E side. After the piston valve assembly is located in the hole $1E_1$, said round leakage-proof rubber pad 9B presses directly against the annular flange $1E_6$ at the outer periphery of said gas outlet ports $1E_2$. The large diameter end of the spiral spring 9C engages said annular projection $9A_4$. The end face line of the end of said lower round protruding post $9A_2$ on said round plate $9A_3$ is approximately flush with end faces of said two round support posts $1E_5$ in the body member 1.

Referring to FIGS. 4-1 and 4-2, a centering guide plate 9D is shown. Said centering guide plate 9D basically is a strip shaped metal sheet; its width is a little larger than the outside diameter of said two round supports posts $1E_5$ and its length is a little longer than the distance between said two round support posts $1E_5$. Each of its two ends along the direction of the longitudinal axis of the centering guide plate 9D is provided with an arc respectively, and near each of the two arcs is provided a round hole $9D_1$, respectively, to mate the threaded holes $1E_5$, in the top face of said two round support posts $1E_5$. A hole $9D_3$ is located at the center of said centering guide plate 9D, and $9D_3$ in flange $9D_4$ is slightly higher than the end face $9D_2$ and is provided at said center hole $9D_3$ in the end face $9D_2$. While said round protruding post $9A_1$ is inserted into the through hole $1E_1$, the larger diameter end of said spiral spring 9C is engaged with said annular projection $9A_4$ and the smaller diameter of said spiral spring 9C is engaged with the flange $9D_4$ of said centering guide plate 9D, so that the spring 9C can be kept in position under a contracted or released condition without any radial shifts and inclinations.

In operation, when the two round holes $9D_1$ in two ends of the centering guide plate 9D and both threaded holes at the top planes of said two round support posts $1E_5$ are mated together and fastened by screws resulting in the proper positioning of the spring 9C, the restoring force produced by the spring 9C under the pressure of the centering guide plate 9D can make the leakage-proof rubber pad 9B tightly block the gas outlet ports $1E_2$.

An important feature of the present invention is that the piston valve assembly 9 is arranged in the pressure reducing chamber 1E with a design to shut off gas flow through the gas outlet ports $1E_2$ in the flow direction. Therefore, even if the pressure in the pressure reducing valve chamber 1E increases sharply during a pressure reducing failure, the high pressure gas in the pressure reducing valve chamber will urge the rubber pad 9B tightly against gas outlet ports $1E_2$, and the unacceptably high pressure gas will not leak out. This feature of the present invention eliminates the disadvantage of conventional gas regulators which do not shut off the gas flow during pressure reducing failure.

Referring to FIGS. 5-1 and 5-2, leakage-proof diaphragm 8 is shown in said drawing. One of end faces 8A in said leakageproof diaphragm 8 is provided with two annular gooves $8A_1$ and $8A_2$ respectively. An annular surface $8A_3$ is enclosed by said annular groove $8A_2$, and a central round concave surface $8A_4$ is enclosed by said annular surface $8A_3$. Near the circumference of the outer periphery of the diaphragm 8 and around another end face 8B of said leakage-proof diaphragm 8, an annular groove $8B_1$ is provided, and except for the part of the end face that is occupied by the annular groove $8B_1$, the remainder of the end face is a flat plane. Said leakage-proof diaphragm 8 is meshed on the wall surface $1K_2$ of thin wall 1K of the body member 1. When the diaphragm is meshed on the wall surface $1K_2$, the projection $8A_5$ between annular grooves $8A_1$ and $8A_2$ in the end face 8A is inserted in to the annular groove $1H_5$. Said leakage-proof diaphragm 8 is provided to avoid gas leakage and also to separate the piston valve assembly 9 from the transmission assembly 3 shown in FIGS. 6-1, 6-2, 6-3, and 11 and described below and to separate the piston valve assembly 9 from the transmission timing device 9 (see FIG. 9).

Referring to FIGS. 6-1, 6-2, and 6-3, the transmission assembly 3 of the timing device 4 is shown. Said transmission assembly 3 consists of a transmission plate base 3A and a transmission plate 3B. At each of the two intersections of the circumference and the longitudinal axis of said transmission plate base 3A is provided with protruding lugs $3A_{31}$, $3A_{32}$, respectively and end edges of said two protruding lugs $3A_{31}$, $3A_{32}$ are of a concave arc shape. A rectangular hole $3A_1$ is located in the longitudinal center of the transmission plate base 3A and also in the position approximately 30° in the counterclockwise direction. The central line of the longer side of said rectangular hole $3A_1$ and the longitudinal central of said transmission plate base 3A intersect at the place near the protruding lug $3A_{32}$. On the lateral sides of the end portion of said rectangular hole $3A_1$ and near the protruding lug $3A_{31}$, two opposite small square protruding plates $3A_2A$ and $3A_2B$ are provided. Pivotal holes $3A_2A_1$ and $3A_2B_1$ are provided in said two small protruding plates $3A_2A$ and $3A_2B$ respectively. Near the protruding plug $3A_{32}$, the width of said shorter part $3A_{12}$ of said rectangular hole $3A_1$ is slightly smaller than that of its longer part $3A_{11}$. Three rectangular support rack plates $3A_4$ which have their own respective suitable lengths and are perpendicular to said transmission plate base 3A are provided and equally spaced on the periphery of said transmission plate base 3A. Top ends of said three support rack plates $3A_4$ have arc cutouts $3A_41$ so as to support fastening bolts 21 on the timing device to provide a proper space between said timing device 4 and said transmission plate base 3A. Transmission plate 3B has an upwardly tapered tail $3B_1$ and a flush straight head $3B_2$. The end edge of said head $3B_2$ is provided with two opposite protruding lugs $3B_4A$, $3B_4B$ which are perpendicular to the post plate surface $3B_{21}$ of said head $3B_2$. Said protruding lugs $3B_4A$, $3B_4B$ are also provided with pivot through holes $3B_4A_1$ and $3B_4B_1$ so as to align with the pivot holes $3A_2A_1$ and $3A_2B_1$ and then to receive a pivot shaft $3B_5$ to pivotally connect said transmission plate 3B and said transmission plate 3A into a single unit. Said transmission plate 3B is made of a metal sheet approximately 1 mm in thickness; and its width is a little wider than that of said rectangular hole $3A_1$. The length of said head $3B_2$ is almost same as that of longer part $3A_{11}$ of rectangular hole $3A_l$. A small rectangular plate $3B_3$ which separates from said head $3B_2$ is formed at the intersection of said head $3B_2$ and said upwardly tapered tail $3B_1$ and extends toward the central part of said head $3B_2$. Said small rectangular plate $3B_3$ declines downward, but its rear end slightly inclines upward. Its head end depends from said head $3B_2$. The disposition of said transmission assembly 3 is such that the protruding lug $3A_{31}$ and transmission plate base 3A are made (1) to directly and respectively press against the two opposite ones of said four semi-circular support racks $1H_6$ on the inner walls of said timing device chamber 1H in the body member to make said transmission plate base easily positioned and also to remove any worry about displacement of said transmission plate base during the assembly process; and (2) to make the small rectangular plate $3B_3$ on said transmission plate 3B precisely press against the round protruding post 9A of said piston valve 9 with said leakage-proof diaphragm 8 therebetween.

A fixing cover plate 5 of the timing device is shown in FIGS. 7-1 and 7-2. Said cover plate 5 basically is a round plate. A large and elongated cutout 5C, slightly in an arc form, is located on said cover plate 5. The three small holes 5A in said cover plate 5 are to receive the three fixing screws on timing device 4. The four larger round holes 5B closer to the periphery of the circumference are to mesh the four threaded holes H7 in the top of the four semi-circular cross section support racks $1H_6$ on the inner wall of said timing device chamber in the body member 1 and then said four fixing screws are used to secure the cover plate 5 to the body member 1.

Furthermore, fastening bolts 21 on the timing device as shown in FIG. 11 pass through holes 5A in cover plate 5 and rest upon support rack plates $3A_4$ for positioning and fixing the timing device with respect to the transmission plate base 3A. In this way, the transmission plate base 3A is directly fixed. Since the periphery of said leakage-proof diaphragm 8 is secured, gas is unable to leak into the timing device chamber 1H. During and after assembly, the assembler can observe through said cutout 5C to check if the assembly is accurate or not and if the transmission plate 3B can precisely actuate the piston valve or not.

Furthermore, as shown in FIGS. 9, 10, and 11, a pressing plate 4A in the timing device 4 is provided with a rectangular leaf spring 4B, and the end of said leaf spring 4B directly presses against one of the fixing bolts 4C on said timing device 4. When the timer is set to provide gas flow, a pressing action of the leaf spring 4B forces the tail end of the pressing plate 4A to press against the upwardly tapered tail $3B_1$ (see FIG. 11) to keep the upwardly tapered small rectangular plate $3B_3$ of said transmission plate 3B pressing downward directly against the top of the piston 9A of the piston valve assembly 9 so as to keep the piston valve assembly 9 in the open state. The open state of the piston valve assembly 9, in turn, permits the pressure reducing valve chamber 1E to communicate with the gas outlet port 1F (see FIG. 1-2) via the gas outlet ports $1E_2$, thereby making the gas flow to a gas-using apparatus via the gas outlet ports $1E_2$, gas outlet port 1F, and the gas outlet 1B from the gas pressure reducing valve chamber.

In contrast, when the timer is turned to zero, the tail end of the pressing plate no longer presses downward directly against said transmission plate 3B, and the piston valve assembly 9 is in the closed state. Said small rectangular plate $3B_3$ is formed of an approximately 1mm thick metal sheet, and its end can bear about 0.5 kg/cm² pressure. Therefore, when the pressure born by said small rectangular plate $3B_3$ is above 0.5 kg/cm², said small rectangular plate $3B_3$ will bend upward and become flat, so that it is impossible to actuate the piston valve 9. Therefore, when a pressure reducing failure occurs to render the pressure in pressure reducing valve chamber to increase about 0.5 kg/cm² (about 10 times of the generally normal pressure of 400 mm Hg) and flatten the small rectangular plate 3B, said piston valve assembly 9 is unable to be opened to supply gas through low pressure pipeline. By this automatic shut off of gas flow in the event of a pressure reducing failure, the user can be signaled that a pressure reducing failure has occurred.

Referring to FIGS. 8-1, 8-2, 10, and 11, a time scale plate 6 is meshed on the top plane of the timing device chamber of the body member 1. Said scale plate 6 is engraved with marks like 0–60 minutes and fully open position to allow the user's setting the length of time they desire to use the gas. The spindle 22 of said timing device 4 protrudes through the center hole of said time scale plate 6, and the top of its spindle is attached with the manually adjusted rotary disc 7 of the gas valve.

During the assembly of the reducing valve arrangement, the leakage-proof diaphragm 10 is first attached to the tail stock 2Ag of the lever type bolt shaft. Then the round metal plate 11 is mounted on the bottom of the leakage-proof diaphragm 10, and the spring 12 is positioned to directly press against the bottom of round metal plate 11. Then the adjustment screw 14 and bottom cover 15 are fixed on the pressure reducing valve cover 13. Finally the pressure reducing valve cover 13 is fastened to the end edge of pressure reducing valve chamber by screws. No pressure relief hole is provided in the center part of the leakage-proof diaphragm (this is different from that of conventional leakage-proof diaphragms), so that no gas will be leaked out even during the pressure reducing failure.

In order to complete the gas regulator apparatus of the invention, a set of automatic overflow control devices is arranged at the gas inlet $1A_1$ of this device. More specifically, as shown in portion N in FIG. 1-2 and in FIG. 11, an automatic overflow control device 16 which is mounted near the gas inlet pipeline passage. The automatic overflow control device includes an automatic shut-off assembly which is located between the gas inlet 1A and the body member 1 to automatically shut off the gas flow in the pipeline passageways during (1) pressure reducing failure and (2) serious gas leakage situations. A release button assembly is located near the automatic shut off 16A to enable a user to manually knock down a stainless steel round bead $16A_2$, which stops gas flow, in order to re-open smooth gas flow in pipeline gas flow. Said automatic shut-off assembly 16A further includes: (1) an oil seal ring $16A_1$ provided at the gas inlet 1A in the body member 1 and located between a pipeline passage $1A_2$ with a diameter larger than that of the round bead $16A_2$; (2) a smaller pipeline passage $1A_3$; (3) a stainless steel bead $16A_2$ located in front of the oil seal ring $16A_1$ to block the opening of said oil seal ring $16A_1$; and (4) a positioning spring $16A_3$ or an eccentric round steel sheet (not shown in the drawing) located in front of said stainless steel bead $16A_2$ to prevent said stainless steel bead $16A_2$ from rolling too far away from said oil seal ring $16A_1$. Therefore said round bead $16A_2$ is able to stay at a suitable position in the pipeline passage $1A_2$ without rolling too far away from its open position. Release button assembly 16B further includes: (1) a base $16B_3$; (2) a connecting rod spindle $16B_5$; (3) an oil seal ring $16B_4$; (4) a spring $16B_2$; and (5) a push cap $16B_1$. The base $16B_3$ has threads and is mounted at the top of the pipeline passage 1A2. The connecting rod spindle $16B_5$ has a lower part with a bottom having a larger outer diameter and an upper part with threads for engaging with the push cap $16B_1$. The seal ring $16B_4$ is located above the larger bottom of the spindle $16B_5$ and is also tightly frictionally fitted with the spindle $16B_4$ to avoid gas leakage. The spring $16B_2$ is provided between the push cap $16B_1$ and base $16_3$ to restore the push cap $16_1$ and the connecting rod spindle $16B_5$ that engages the push cap $16B_1$ to their original positions together, when the pressure applied to the top of the push cap $16B_1$ is released.

In operation, the high pressure gas flows into the pressure reducing chamber 1E from the pipeline inlet 1A via the inlet nozzle $1A_1$. The round thin pad $2A_3$ on the pressure reducing component 2 comes into contact with and out of contact with the gas inlet nozzle $1A_1$ to control the flow-in gas volume, which inturn, adjusts the gas pressure in the pressure reducing chamber 1E. The pressure reducing component 2 is pivotally fixed, with its pivot $2A_5$ on the rectangular recess $1D_1$, and the distance between the pivot $2A_5$ and the tail $2A_2$ is longer than the distance between the pivot $2A_5$ and the head $2A_1$. When the pressure of gas entering the pressure reducing chamber 1E becomes high, the high pressure is applied on the leakage-proof diaphragm 10 and is strong enough to overcome the spring 12. The net resultant force of the force applied by the round metal plate 11 on the leakage-proof diaphragm 10 and the force applied on the round thin pad $2A_3$ causes the round thin pad $2A_3$ of the pressure reducing component 12 to move toward the gas inlet nozzle $1A_1$ to prevent further entry of high pressure gas, and the pressure in the pressure reducing chamber changes. This, in turn, causes the volume of gas flowing into the pressure reducing chamber 1E to be reduced which also causes the gas pressure to lower. Conversely, when the pressure of the gas flowing into the pressure reducing chamber 1E is low or non-existent, the low gas pressure therein will cause the gas pressure that is applied to the leakage-proof diaphragm 10 to be reduced, which in turn permits the force that the spring 12 applies to the leakage-proof diaphragm 10 to overcome the opposing force that the gas applied to the leakage-proof diaphragm 10. Thereby, the round thin pad $2A_3$ on the pressure reducing component 2 moves in a direction away from the gas inlet nozzle $1A_1$ to cause the volume of gas flowing into the pressure reducing chamber 1D to increase. This inturn causes the gas pressure in the pressure reducing chamber to also increase. The above described method of operation causes the gas in the pressure reducing chamber to maintain a stable selectable pressure level. A user can use the adjustment element 14 to adjust the force that the spring 12 applies on the leakage-proof diaphragm 10 properly to adjust the outlet gas pressure.

As shown in FIGS. 9 and 11, on the lower side of the timing device 4 in a round piece having a cutout which meshes a protrusion of the pressing plate 4A. When the cutout engages the protrusion, the timer is zeroed to shut off the piston valve assembly 9. When the timing device 4 is turned clockwise, for instance, to the 30-minute mark, said cutout gets off the protrusion to make the pressing plate 4A outwardly press the tail $3B_1$ to the transmission plate 3B. The transmission plate 3B moves outward and causes the small rectangular plate $3B_3$ to press downward against the piston 9A of the piston valve assembly 9, thereby moving the piston valve assembly 9 to an open state. Upon expiration of the preset 30-minute period, the cutout and the protrusion engage together again to shut off the piston valve assembly 9.

Just like conventional times in the prior art, the timing device 4 enables the time that the cutout and protrusion restore their engagement to be controlled by the timing device 4. The time scale plate 6 indicates the time required to achieve the purpose of time control. However, when the timing device 4 is turned counterclockwise (not clockwise for setting a timed gas flow), this will make the piston valve fully open and free from the time control. In such a case, the gas pipeline passage is fully open without any time limit, and since this belongs to the conventional skill and art, no detailed elaboration on such a position is needed here.

When the pressure in the pressure reducing chamber 1E increases to 0.5 kg/cm$^2$, which is the maximum level that the small rectangular plate $3B_3$ can withstand during a pressure reducing failure of the related assembly, the small rectangular plate $3B_3$ will be pressed flat by the up-bending piston $9A_1$. When bent thusly, the plate $3B_3$ can no longer actuate the piston valve 9.

Summarizing the above description, this invention not only shuts off the gas flow in the pipeline passage at the pressure reducing failure but also signals the pressure reducing failure by means of its transmission plate. Furthermore, the invention automatically shut off gas flow in the pipeline passage during gas overflows to avoid serious disasters.

I claim:

1. A regulator means for automatically shutting off gas flow from a high pressure source during pressure reducing failure includes:

a body member which is cylindrical in shape including a gas inlet and a gas outlet on its two outer sides, an inlet nozzle provided near the inner lateral end of said gas inlet, a thin wall integrally formed with said body member located transversely in said body member separating and dividing space in said body member into a pressure reducing valve chamber and a timing device chamber, a telescopic through hole positioned off the center of the wall surface of said thin wall and also passing through said thin wall, three gas outlet ports located around the periphery of said telescopic through hole and also passing through said thin wall, each of said gas outlet ports spaced by three thin partition bars, wall surfaces of said thin wall which face said pressure reducing valve chamber being provided with a slightly higher flange around the outer periphery of said gas ports, said higher flange near the outer periphery of said gas ports, said body member being provided with two opposite thin arcuate plates which are integrally formed with said wall surface defining a space for a piston valve assembly, immediate at the outer sides of said two thin arcuate plates two opposite round support posts with a suitable height provided respectively, a screw hole provided on each of the ends of said two opposite round support posts to mesh a centering guide plate, two opposite protruding posts being provided on two front internal sides of said inlet nozzle, each of said two protruding posts being higher than the inlet nozzle and having a rectangular recess and a threaded hole respectively to secure a pressure reducing component, a wall surface of said thin wall facing the timing device chamber being provided with upright annular flange which is higher than said wall surface and also is located near said gas outlet ports, a semi-circular groove provided on said wall surface opposite to the semicircular protruding surface an outer gas outlet port located at the groove surface of said semicircular groove near the gas outlet, a small elongated moon-shaped groove being provided at the opposite side relative to said semi-circular groove and also communicative to the gas inlet nozzle serving as a gas inlet channel, an annular recess located outside the periphery of said upright annular flange for meshing with a leakage-proof diaphragm, semi-circular support racks within said timing device chamber integrally formed with said body member and also having a height shorter than that of said timing device chamber, said racks having threaded holes at their top end faces to match corresponding holes in a timing device cover plate for fastening the timing device to said body member by screws;

a transmission assembly located at the bottom of the timing device chamber for supporting the timing device and for actuating the piston valve, said transmission assembly including a deformable diaphragm in communication with said piston valve, said timing device permitting gas flow for a preset length of time by urging said piston valve open for the preset time period;

a leakage-proof timing chamber diaphragm located between the transmission assembly and the thin wall in the body member;

a timing device assembly supported by the transmission assembly;

a fixing cover plate for fixing the timing device with respect to the transmission plate base;

a time scale plate placed over the fixing plate;

a gas valve rotary disc located on the body member top;

a piston valve assembly located in the pressure reducing valve chamber for controlling the gas flow from the pressure reducing valve chamber said piston valve assembly in communication with said timing device through said transmission assembly and said timing chamber diaphragm;

a pressure reducing valve assembly including a pressure reducing component for alternately opening and closing said inlet nozzle for alernately admitting and closing off flow of high pressure gas into said pressure reducing chamber, a leakage-proof pressure reducing diaphragm separating the pressure reducing chamber from outside the regulator means, said pressure reducing diaphragm controlling said pressure reducing component, a round metal plate supporting said pressure reducing diaphragm, a spring urging said round metal plate thereby urging said diaphragm and thereby controlling said pressure reducing component, a pressure reducing valve cover, an adjustment nut for adjusting said spring, and a bottom cover, whereby a predetermined pressure in said pressure reducing chamber is controlled by the opposing tendencies of high pressure gas to open said inlet nozzle by opening said pressure reducing component in opposition to the opposing tendency of the pressure reducing component to be closed against the inlet nozzle by the urging of the spring which urges the pressure reducing diaphragm;

an automatic overflow control device mounted at the gas inlet of the body member including an automatic pipeline passage shut-off assembly including a release button assembly;

wherein when flow of high pressure gas from the high pressure source is cut by the pressure reducing component to provide gas of reduced pressure in the pressure reducing chamber during normal pressure reducing operation, the reduced pressure gas in the pressure reducing chamber passes through the piston valve assembly which is operated and opened by the timing device and the deformable diaphragm of the transmission assembly and then flows from the gas outlet to an apparatus that consumes the gas until the preset length of time on the timer device expires, and wherein when a pressure reducing failure occurs and the pressure in the pressure reducing chamber exceeds a predetermined reduced pressure, the deformable diaphragm of the transmission assembly is deformed by the piston valve which is urged into its off position by the high pressure gas in the pressure reducing chamber to prevent high pressure gas from flowing out from the pressure reducing chamber, when said deformable diaphragm is deformed by said piston valve from high pressure gas in the pressure reducing chamber, said deformable diaphragm prevents the timer device from opening said piston valve thereby preventing gas to flow out from the pressure reducing chamber even before the preset length of time expires.

2. The regulator means described in claim 1 wherein said piston valve assembly further includes a piston, a leakage-proof rubber pad, a spiral spring and a piston valve centering guide plate whereby during assembly, said leakage-proof rubber pad is placed on the top of a round plate of the piston, then a larger diameter end of said spiral spring is fitted to an annular protrusion on the bottom of said round plate and the smaller diameter end of said spiral spring is fitted to the centering guide plate so as to position said spiral spring in place without radial deflection and inclination.

3. The regulator means described in claim 2 wherein said centering guide plate is a rectangular strip with a width slightly wider than the outside diameter of said two round support posts and a length slightly longer than the distance between said two round support posts, each of the two ends of said centering guide plate along its longitudinal direction is provided with an arc respectively, and near each of the arcs is provided a round hole respectively to mesh the corresponding threaded holes in the end of opposite two round support posts, a center hole is provided at the center of said centering guide plate which has an upright flange with a little height at its one side to fit the smaller diameter end of said spiral spring for pressing said piston, a small arcuate cutout is provided on the plate at the near end of said centering guide plate for making a tail of a lever-typle bolt shaft properly fit the leakage-proof diaphragm.

4. The regulator means described in claim 1 wherein said transmission assembly includes a transmission plate base and a transmission plate, at suitable places on the periphery of said transmission plate base are provided with two opposite protruding lugs with end faces in a concave arcuate form for easily positioning said transmission plate base, and further including three rectangular support rack strips with a suitable length and perpendicular to said transmission plate base equally spaced along the periphery of said transmission plate base, the top ends of said three support rack strips having arcuate cutouts to support the timing device, a rectangular hole provided on the transmission plate base and located at an angle in the counterclockwise direction of the longitudinal central line of said transmission plate base, and the central line of the longer sides of said rectangular hole intersecting the longitudinal central line of said transmission plate base near one of said protruding lugs, and an end port of another protruding lug near said rectangular hole provided with two upright small square protruding plates, each of which is provided with a pivotal hole respectively, said transmission plate being made of an approximately 1mm metal plate and having a flat straight head and a upwardly tapered tail, and two upright opposite protruding lugs provided between two end edges of said head and also perpendicular to the surface of said head, said two upright protruding lugs having pivotal holes respectively to align the pivotal holes for receiving a pivot, thereby pivoting said transmission plate and said transmission plate base into a single unit, a small rectangular plate which is separated from said head extends from the intersection of said head and said tail toward a central part of said head and also declines downward, but its rear end slightly inclines upward and its front end maintains connection with said head.

5. The regulator means described in claim 1 wherein one of the end faces of said leakage-proof diaphragm is provided with two annular grooves one smaller and one larger, an annular surface is toward the inner side of said smaller annular groove encloses said annular surface also encloses a central concave round spherical plane, another end face of said leakage-proof diaphragm is provided with another annular groove near the outer periphery of said diaphragm.

6. The regulator means described in claim 1 wherein the timing device chamber in said body member is provided with several semi-circular cross section support racks on the inner wall of the chamber, and top planes of said support racks are a little lower than that of said timing device chamber, and also top planes of said racks have threaded holes respectively.

7. The regulator means described in claim 1 wherein said fixing cover plate of the timing device is substantially a round plate including a large and elongated U-shaped cutout provided in the outer side of said round plate, several small holes at the suitable places on said round plate are provided for fitting fixing screws to the timing device, four round holes near the circumference of said round plate are provided to receive screws for fastening the timing device to the body member.

8. The regulator means described in claim 1 wherein said time scale cover is fitted on the top of said timing device chamber for a user to set a desired time for using the gas supply.

9. The regulator means described in claim 1 wherein a pressing plate in the timing device is fixedly provided with an elongated leaf spring, and the end portion of said leaf spring presses directly against one of a plurality of fixing bolts on said timing device, the pressing action resulting from the elasticity of said leaf spring forces, a tail of the pressing plate keeping said transmission plate pressed downward directly against the piston valve assembly, thereby causing the piston valve assembly to be in the open state, or when the timer returns to zero, forcing the tail of the pressing plate to no longer press said transmission plate downward thereby causing the piston valve assembly to be in the closed state.

10. The regulator means described in claim 1 wherein said automatic overflow control device further includes an oil seal ring provided at the inlet in the body member and also located between a pipeline passage with a diameter larger than that of a round bead with a diameter smaller than the inner diameter of said pipeline passage located in front of said oil seal ring, for blocking the opening of said oil seal ring, a positioning spring located in front of said bead to prevent said bead from rolling too far away from said oil seal ring, thereby said bead is able to stay at a suitable place in the pipeline passage and is capable of blocking the opening of oil seal ring whenever a pressure reducing failure occurs or the gas overflows, thereby achieving the result of automatically shutting the pipeline passage off.

11. The regulator means described in claim 10 wherein said automatic overflow control device further includes a release button including a base, a connecting rod spindle, an oil seal ring, a spring, and a push cap wherein said base has threads on its lower part to engage with the top of the pipeline passage at the top, wherein said connecting rod spindle has a lower part with a larger outer diameter and an upper part with threads for engaging with said push cap, wherein said oil seal ring is located over the bigger bottom of said spindle and for a tight frictional coupling with said spindle to avoid gas leakages, wherein said spring is provided between the push cap and base so as to make the push cap and connecting rod spindle that engages with the push cap return back their to original positions whenever pressure applied on the top of the push cap is released, wherein the push cap is placed over the base whereby as long as said bead blocks the opening of said oil seal ring, a pressure is applied on the top of said push cap to actuate the connecting rod spindle to strike down said bead, thereby making the pipeline passage restore the smooth gas flow therein.

12. In a device for the regulation of the flow of a gaseous stream having a pressure condition, said device being of the type having a housing including an inlet port and an outlet port, levered shaft means positioned at the inlet port being responsive to the pressure condition of the gaseous stream for preventing the flow of a gaseous stream through said inlet port, a pressure reducing valve positioned between the inlet port and the outlet port for reducing the pressure condition of and regulating the flow of the gaseous stream through the regulator, and means for selectively preventing the flow of the gaseous stream through the outlet in response to the pressure condition of the gaseous stream, the improvement thereon comprising:

a housing having an upper timing chamber and a lower pressure reducing chamber, wherein the inlet port and the outlet port are each formed in the pressure reducing chamber;

the pressure reducing valve includes an adjustable, deformable diaphragm positioned in the pressure reducing chamber for deforming movement away from the inlet port in response to an increase in the pressure condition of the gaseous stream, means for adjusting the diaphragm to selectively increase and decrease its deformation to the pressure condition of the gaseous stream, a first shut off valve pivotably mounted in the pressure reducing chamber, said shut off valve including a rearward portion secured to the diaphragm and further including a head portion, wherein deforming movement of the diaphragm in response to an increase in the pressure condition of the gaseous stream pivots the head portion into a first position, so that said head portion contacts the inlet port, preventing the gaseous stream from entering the reducing chamber, and further wherein when the diaphragm is not deformed in response to the pressure condition of the gaseous stream, the head portion of the shut off valve is pivoted into a position spaced from the inlet port permitting the free flow of the gaseous stream through the inlet port and into the pressure reducing chamber; wherein said means for selectively preventing comprises a second shut off valve having a first position, wherein the second valve prevents the free flow of the gaseous stream through the outlet port and a second position, wherein the second valve permits the free flow of the gaseous stream from the pressure reducing chamber through the outlet port; said second valve being resiliently biased, being constantly urged into its first position;

a timer having a resiliently biased portion, said biased portion being operatively associated with the second shut off valve through a transmission plate for overcoming the biasing action of the second valve, such that the second valve moves between its first and second positions in response to the timer, and wherein in response to an increase in the pressure condition of the gaseous stream upon the second valve, the biasing action of the resiliently biased portion of the timer may be overcome moving the second valve into its second position.

13. A regulator means for automatically shutting off gas flow from a high pressure gas source during pressure reducing failure, said regulator means comprising:

a housing;

an inlet in said housing;

a pressure reducing chamber in said housing communicating with said inlet through an inlet nozzle;

means for opening and closing said inlet nozzle, said nozzle opening and closing means spring biased to predetermined pressure settings, said opening and closing means working in opposition to high pressure gas from the high pressure gas source;

an outlet opening from said pressure reducing chamber;

piston valve assembly means for opening and closing said outlet opening, said piston valve assembly means including a piston valve which directly opens and closes said outlet opening, said piston valve assembly located in said pressure reducing chamber;

a timer device in said housing for controlling the opening and closing of said piston valve, said timer device including a deformable diaphragm which urges said piston valve in the open position when normal pressures are in the pressure reducing chamber, said timer device further including a deformable transmission plate pressing against said piston valve such that when high pressure exist in the pressure reducing chamber and the high pressure urge the piston valve closed, deforming the transmission plate thereby preventing high pressure gases from exiting from the pressure reducing chamber through the outlet opening.

14. The regulator means described in claim 13, further including an automatic overflow control assembly located between said inlet and said inlet nozzle, said overflow assembly automatically cutting off flow of high pressure gas from the high pressure gas source to said pressure reducing chamber when the pressure of the high pressure gas is excessively high.

* * * * *